US011059955B2

(12) United States Patent
Wu

(10) Patent No.: US 11,059,955 B2
(45) Date of Patent: Jul. 13, 2021

(54) COLOR SHIFT PIGMENTS FOR THREE-DIMENSIONAL PRINTING

(71) Applicant: XEROX CORPORATION, Norwalk, CT (US)

(72) Inventor: Jin Wu, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 229 days.

(21) Appl. No.: 16/154,324

(22) Filed: Oct. 8, 2018

(65) Prior Publication Data

US 2019/0039285 A1  Feb. 7, 2019

Related U.S. Application Data

(62) Division of application No. 14/862,045, filed on Sep. 22, 2015, now Pat. No. 10,124,530.

(51) Int. Cl.
| | |
|---|---|
| *B32B 5/16* | (2006.01) |
| *C08K 9/02* | (2006.01) |
| *C09D 11/037* | (2014.01) |
| *C09D 11/10* | (2014.01) |
| *C09D 11/34* | (2014.01) |
| *C09D 11/50* | (2014.01) |
| *B29C 64/118* | (2017.01) |
| *B29C 70/88* | (2006.01) |
| *B29K 67/00* | (2006.01) |
| *B29K 55/02* | (2006.01) |
| *B29C 70/58* | (2006.01) |
| *B29K 25/00* | (2006.01) |
| *B29K 29/00* | (2006.01) |
| *B29K 77/00* | (2006.01) |
| *B29K 511/14* | (2006.01) |
| *B29C 48/00* | (2019.01) |
| *C08K 3/22* | (2006.01) |
| *C08K 3/34* | (2006.01) |
| *C08K 5/541* | (2006.01) |
| *B33Y 10/00* | (2015.01) |
| *B33Y 70/00* | (2020.01) |
| *B29L 9/00* | (2006.01) |
| *C08K 9/10* | (2006.01) |

(52) U.S. Cl.
CPC .............. *C08K 9/02* (2013.01); *C09D 11/037* (2013.01); *C09D 11/10* (2013.01); *C09D 11/34* (2013.01); *C09D 11/50* (2013.01); *B29C 48/022* (2019.02); *B29C 64/118* (2017.08); *B29C 70/585* (2013.01); *B29C 70/88* (2013.01); *B29K 2025/04* (2013.01); *B29K 2029/04* (2013.01); *B29K 2055/02* (2013.01); *B29K 2067/00* (2013.01); *B29K 2067/046* (2013.01); *B29K 2077/00* (2013.01); *B29K 2511/14* (2013.01); *B29L 2009/00* (2013.01); *B33Y 10/00* (2014.12); *B33Y 70/00* (2014.12); *C08K 3/22* (2013.01); *C08K 3/34* (2013.01); *C08K 5/541* (2013.01); *C08K 9/10* (2013.01)

(58) Field of Classification Search
CPC ... B29C 64/118; B29K 2101/12; B33Y 70/10; C09C 1/0015; Y10T 428/2991; Y10T 428/2993
USPC ........................................................ 428/403
See application file for complete search history.

(56) References Cited

U.S. PATENT DOCUMENTS

| | | | |
|---|---|---|---|
| 5,556,727 A | 9/1996 | Ciccarelli et al. | |
| 6,074,754 A * | 6/2000 | Jacobsen | C03C 1/04 427/215 |
| 6,569,529 B1 * | 5/2003 | Phillips | C09C 1/0015 106/403 |
| 6,866,807 B2 | 3/2005 | Comb et al. | |
| 7,959,727 B2 | 6/2011 | Bujard et al. | |
| 8,460,451 B2 | 6/2013 | Xu et al. | |
| 8,801,990 B2 | 8/2014 | Mikulak et al. | |
| 9,657,167 B2 | 5/2017 | Kim et al. | |
| 2004/0142818 A1 * | 7/2004 | Dayman | B41M 5/385 503/201 |
| 2010/0258769 A1 * | 10/2010 | Krietsch | C09D 11/037 252/519.4 |
| 2013/0095302 A1 * | 4/2013 | Pettis | B29C 64/106 428/195.1 |
| 2014/0070461 A1 * | 3/2014 | Pax | B29C 64/393 264/401 |
| 2014/0079841 A1 * | 3/2014 | Pridoehl | B29C 64/40 425/375 |
| 2016/0002468 A1 * | 1/2016 | Heikkila | C08J 5/06 428/35.6 |

FOREIGN PATENT DOCUMENTS

WO    WO-9308237 A1 *  4/1993    ........... C09C 1/0051

OTHER PUBLICATIONS

Son et al., Designed Synthesis of SiO2/TiO2 Core/Shell Structure As Light Scattering Material for Highly Efficient Dye-Sensitized Solar Cells, dx.doi.org/10.1021/am400441v | ACS Appl. Mater. Interfaces 2013, 5, 4815-4820 (Year: 2013).*

(Continued)

*Primary Examiner* — Hoa (Holly) Le
(74) *Attorney, Agent, or Firm* — Pillsbury Winthrop Shaw Pittman LLP

(57) ABSTRACT

Materials for use in 3D printing comprising a color shift pigment that change colors when viewed at different angles. More specifically, the materials comprise a color shift pigment being a silicon oxide core with metal oxide shell disposed thereon and a polymeric component.

20 Claims, No Drawings

(56) References Cited

OTHER PUBLICATIONS

Pfaff, Gerhard and Peter Reynders, "Angle-dependent optical effects deriving from submicron structures of films and pigments." Chemical reviews 99.7 (Jun. 11, 1999): 1963-1982. (Year: 1999).
What Material Should I Use For 3D Printing?—Advanced Materials Post #1—BendLay, Laywoo-D3 and LayBrick, 17-pages (Year: 2016).

* cited by examiner

COLOR SHIFT PIGMENTS FOR THREE-DIMENSIONAL PRINTING

CROSS REFERENCE TO RELATED APPLICATIONS

This application is a divisional application of U.S. application Ser. No. 14/862,045, filed Sep. 22, 2015 which is incorporated herein by reference in its entirety

BACKGROUND

The present disclosure relates to three-dimensional (3D) printing. In particular, the present disclosure relates to a novel 3D printing material which incorporates a color shift pigment.

3-D printing has been a popular method of creating various prototypes. There are several different methods of 3-D printing, but the most widely used and the least expensive is a process known as Fused Deposition Modeling (FDM). FDM printers use a thermoplastic filament, which is heated to its melting point and then extruded, layer by layer, to create a three dimensional object.

Fused Deposition Modelling (FDM) is one of the more common modes employed in 3D printing. FDM printers use a thermoplastic filament, which is heated to its melting point and then extruded, layer by layer, to create a three dimensional object. In particular, a thermoplastic material is first extruded into filament, then the filament wire supplies material into a heated nozzle. Molten thermoplastic filament is then extruded from the nozzle and material is disposed in layers. FDM printers use a printing material, which constitutes the finished object, and a support material, which acts as a scaffolding to support the object as it is being printed. It has the benefit of being one of the least expensive and most accessible for 3D printers, especially for industrial prototypes and for the home hobbyist.

The most common printing material for FDM is acrylonitrile butadiene styrene (ABS) which is a thermoplastic and has a glass transition temperature of about 105° C. Another common printing material for FDM is poly-lactic acid (PLA) which is a biodegradable thermoplastic aliphatic polyester derived from renewable resources and has a glass transition temperature 60-65° C. Both ABS and PLA are easily melted and fit into small molds. Although several materials with unique specifications are available, such as PLA and ABS, there is a continuing need for new polymers and polymer combinations to provide a wider selection of specifications and capabilities to address various downstream applications of the resultant printed object.

Color shift pigments are commonly used in a variety of paints, inks, extrusions, powder coatings, plastics, and other forms for decorative and security applications. Color shift pigments exhibit the property of changing color upon variation of the angle of incident light, or as the viewing angle of the observer is shifted. That is, substrates painted or printed with color shift pigments show change of color when viewed at different angles. However, to date, the use of color shift pigments in 3D printing has not been known.

Thus, there is a need to provide 3D printing compositions that may provide desirable new properties to the resulting 3D printed object such as the ability to create a wide range of effect colors.

SUMMARY

In some aspects, embodiments herein relate to a color shift material for three-dimensional printing, comprising a color shift pigment having a core-shell structure, wherein the core comprises a silicon oxide, and the shell comprises a metal oxide; and a polymeric component, wherein the color shift pigment is dispersed within the polymeric component.

In some aspects, embodiments herein relate to a three-dimensional product comprising the color shift material described above.

In particular, embodiments herein relate to a three-dimensional product comprising a color shift material for three-dimensional printing, comprising a color shift pigment having a core-shell structure, wherein the core comprises a silicon dioxide, and the shell comprises a metal oxide; wherein the color shift core comprises from about 10 to about 90 percent by weight of the total weight of the color shift pigment, and the metal oxide shell comprises from about 10 to about 90 percent by weight of the total weight of the color shift pigment; and a polymeric component, wherein the color shift pigment is dispersed within the polymeric component; wherein the color shift material is formed into one or more filaments.

In some aspects, embodiments herein relate to methods of 3D printing comprising: providing a color shift material for use in three-dimensional printing comprising a color shift pigment having a core-shell structure, wherein the core comprises a silicon oxide and the shell comprises a metal oxide, and a polymeric component, wherein the color shift pigment is dispersed within the polymeric component; extruding the color shift material to provide a filament; and supplying the filament to a heated nozzle to apply the color shift material to a substrate to form three-dimensional object on the substrate.

DETAILED DESCRIPTION

Embodiments herein provide color shift pigments which can be used for 3D printing to produce a 3D object that has the capability of creating a wide range of effect colors. It is believed that the incorporation of color shift pigments into 3D printed objects will have more vivid and profound color effects than their incorporation into 2D printed objects.

The terms "three-dimensional printing," "3D printing," and the like generally describe various solid freeform fabrication techniques for making three-dimensional objects by selective deposition, jetting, and fused deposition modeling.

The color shift material of the present disclosure includes a color shift pigment and a polymeric component. The color shift pigment may be a core-shell structure.

In embodiments, the core of the color shift pigment comprises a silicon oxide, and the shell disposed over the core comprises a metal oxide. In particular, the core may be comprised entirely of the silicon oxide and the shell be comprised entirely of the metal oxide. The metal oxide shell provides the source of the colorant, and the core shell structure provides the color shift effect.

The color shift core may include silicon oxide to help yielding a smooth color shift and iridescent interference effect. In embodiments, the silicon oxide core is coated with a metal oxide shell. In embodiments, the silicon oxide comprises silicon dioxide.

The metal oxide shell may include one or more metal oxide, one or more mixed metal oxide, or a mixture of the one or more metal oxide and the one or more mixed metal oxide. Examples of metal oxide include, but are not limited to, titanium dioxide ($TiO_2$), tin oxide ($SnO_2$), selenium trioxide ($Se_2O_3$), ceric oxide ($CeO_2$), yttrium oxide ($Y_2O_3$), ferric oxide ($Fe_2O_3$), zinc oxide (ZnO), zirconium oxide (ZrO$_2$), copper oxide, aluminum oxide, and mixtures thereof. Examples of mixed metal oxide include, but are not limited to, zinc iron chrome oxide, iron chrome oxide, nickel antimony titanium oxide, chrome antimony titanium oxide, chrome aluminum oxide, cobalt chrome oxide, cobalt titanium oxide, chrome iron oxide, copper chrome oxide, chrome iron nickel oxide, cobalt aluminum oxide, cobalt chrome aluminum oxide, zinc iron oxide, and mixtures thereof. The color shift pigment may have an average particle size of from 1 to 50 µm (microns), from 2 to 40 µm, or from 5 to 30 µm. The color shift pigment may be in the form of a platelet.

The silicon oxide particle may have an average particle size of from 0.1 to 50 µm, from 1 to 40 µm, or from 2 to 30 µm. The amount of silicon oxide presented in the color shift pigment may be in the range of about 1 and about 99 percent, or about 5 and about 90 percent by weight of the total weight of the color shift pigment.

Examples of the color shift pigments may include commercially available color shift pigments from H.W. Sands Corp. (Jupiter, Fla.) under the trademark of Sands-Secure®. They are synthetic pigments of 5-50 microns in size. Examples of Sands-Secure® color shift pigments includes: Azure pigment possesses gold-green to deep blue color shift; Cassius pigment possesses violet to green-blue color shift; Cyprus pigment possesses copper to bronze-green color shift; Valeri pigment possesses turquoise to silver color shift; and Vienna pigment possesses green to orange-red color shift.

Other commercial color shift pigments may also include Colorstream® from EMD Performance Materials.

In embodiments, the color shift core may optionally be blended with other colorants, for example, pigment flakes, particles, or dyes of different hues, chroma and brightness to achieve the color characteristics desired. In embodiments, the color shift core may contain from about 0.1 percent to about 5 percent, from about 0.2 percent to about 3 percent, or from about 0.5 percent to about 2 percent by weight based on the total weight of the color shift pigment.

Various suitable colorants of any color can be present in the color shift material, including suitable colored pigments, dyes, and mixtures thereof including REGAL 330®; (Cabot), Acetylene Black, Lamp Black, Aniline Black; magnetites, such as Mobay magnetites M08029™, MO8060™; Columbian magnetites; MAPICO BLACKS™ and surface treated magnetites; Pfizer magnetites CB4799™, CB5300™, CB5600™, MCX6369™ Bayer magnetites, BAYFERROX 8600™, 8610™; Northern Pigments magnetites, NP-604™, NP-608™; Magnox magnetites TMB-100™, or TMB-104™; and the like; cyan, magenta, yellow, red, green, brown, blue or mixtures thereof, such as specific phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colored pigments and dyes that can be selected are cyan, magenta, or yellow pigments or dyes, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Other colorants are magenta colorants of (Pigment Red) PR81:2, CI 45160:3. Illustrative examples of cyans that may be selected include, copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Forum Yellow SE/GLN, CI Dispersed Yellow 33 2,5-dimethoxy-4-sulfonanilide phenylazo-4'-chloro-2,5-dimethoxy acetoacetanilides, and Permanent Yellow FGL, PY17, CI 21105, and known suitable dyes, such as red, blue, green, Pigment Blue 15:3 C.I. 74160, Pigment Red 81:3 C.I. 45160:3, and Pigment Yellow 17 C.I. 21105, and the like, reference for example U.S. Pat. No. 5,556,727, the disclosure of which is totally incorporated herein by reference.

The colorant, more specifically black, cyan, magenta and/or yellow colorant, is incorporated in an amount sufficient to impart the desired color to the 3-D printing material. In general, pigment or dye is selected, for example, in an amount of from about 2 to about 60 percent by weight, or from about 2 to about 9 percent by weight for color 3-D printing material, and about 3 to about 60 percent by weight for black 3-D printing material.

As discussed, the color shift material further comprises a polymeric component (or polymeric matrix) that can be a plastic, such as acrylonitrile butadiene styrene (ABS), polylactic acid (PLA), nylon, polyethylene terephthalate (PET), polyvinyl alcohol (PVA), high impact polystyrene (HIPS), or a wood material such as natural wood or a laywood (a PLA/wood composite), and mixtures thereof. In embodiments, the color shift pigment is extruded together with the polymeric component to form the 3D color shift material. The color shift material may be in the form of a filament or other forms.

In embodiments, the color shift core comprises from about 10 to about 90 percent, or from about 15 to about 85 percent, or from about 20 to about 80 percent by weight of the total weight of the color shift shell-core component. In embodiments, the metal oxide shell comprises from about 10 to about 90 percent, or from about 15 to about 85 percent, or from about 20 to about 80 percent by weight of the total weight of the color shift shell-core component. In embodiments, the color shift core-shell component has an average particle diameter of from about 1 to about 50 µm, or from about 2 to about 40 µm, or from about 5 to about 30 µm.

The color shift pigment can be combined and extruded with the polymeric component, such as a plastic like ABS, PLA, Nylon, PET, PVA, HIPS, or a wood like natural wood or a laywood (a PLA/wood composite). The PLA, polylactic acid or polylactide, with the following structure has been widely used as the 3D-printed filament material:

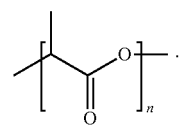

Biodegradable PLA materials are available from NatureWorks, LLC (Minnetonka, Minn.).

In embodiments, the color shift pigment may be presented in the amount of from about 1 percent to about 50 percent, from about 5 percent to about 40 percent, or from about 10 percent to about 30 percent by weight of the total weight of the color shift material.

In embodiments, the polymeric component may be presented in the amount of from about 50 percent to about 99 percent, from about 60 percent to about 95 percent, or from about 70 percent to about 90 percent by weight of the total weight of the color shift material.

In general, the color shift material has a color shift pigment to polymeric component ratio of about 1:99 to about 1:1, about 1:19 to about 1:1.5, or about 1:9 to about 1:2.3.

In embodiments, the number average molecular weight of the color shift material may be in a range from about 5,000 to about 100,000 grams per mole, or from about 10,000 to about 200,000 grams per mole. In embodiments, the weight average molecular weight of the color shift material may be in a range from about from about 10,000 to about 500,000 grams per mole, or from about 20,000 to about 200,000 grams per. Certain physical properties render the color shift material suitable for use in 3D printing, these include a softening point ranging from about 50° C. to about 250° C., or from about 60° C. to about 200° C.; a viscosity of from about 200 centipoise to about 10,000 centipoise, or from about 1,000 centipoise to about 8,000 centipoise at 100° C. to about 200° C.; a Young's Modulus of from about 0.5 to about 5 gigapascals or from about 0.5 to about 2 gigapascals; a Yield Stress of from about 10 to about 100 megapascals or from about 10 to about 60 megapascals; a $T_g$ of from about 50° C. to about 200° C. or from about 60° C. to about 150° C.

In embodiments, the color shift material is formed into a filament, a spool or granules for use in 3D printing.

In embodiments, there are provided methods of 3D printing comprising providing a color shift material for use in 3D printing. The method may further comprise extruding the color shift material to provide a filament, and supplying the filament to a heated nozzle to apply the color shift material to a substrate to form an object on the substrate.

When 3D printing with the color shift material disclosed herein there may be provided a support material. This material is generally removable and serves as a temporary support when making complex three-dimensional objects. Suitable support materials are well known in the art. See for example, U.S. Pat. No. 8,460,451 which is incorporated herein by reference in its entirety.

The support material may be delivered through the same or different print head as the color shift material. The support material is often delivered as a liquid and typically comprises a hydrophobic chemical material that is solid at ambient temperature and liquid at elevated application temperatures. However, unlike the color shift material, the support material is subsequently removed to provide the finished three-dimensional part.

Removal of the support material can be accomplished through several processes, including heating the support material to a temperature above its melting point in conjunction with the use of a suitable organic carrier to sufficiently remove the support material from the color shift material.

In embodiments, a method of printing a three dimensional article comprises selectively depositing layers of a color shift material, as disclosed herein, as a build material to form the three dimensional article on a substrate, the build material may optionally include a diluent. In embodiments, a method of printing a three dimensional article further comprises supporting at least one layer of the build material with a support material. Additionally, the build material and/or support material, in embodiments of methods described herein, is selectively deposited according to an image of the three dimensional article, the image being in a computer readable format.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 30° C.

EXAMPLES

Example 1

This example describes the preparation and characterization of exemplary 3D-printed color shift material in accordance with embodiments herein.

Preparation of Color Shift Material: Mix and extrude the color shift core-shell component together with a polymeric component, for example, PLA. Feed 47.5 g of PLA polymer into a Haake mixer heated to 62° C. Gradually feed 2.5 g of Cassius pigment into the hopper, and compound the mixture at 30 RPM for 30 minutes. After 30 minutes, turn the Haake off, and remove the mixture from the mixer. After cooling, ground the mixture into fine pellets, and feed into the MFI instrument and equilibrate at 90° C. for 6 minutes. Next, extrude the material with a 17 kg weight through a 2 mm diameter die. A 1 m section of filament is generated. The co-extrusion produces the color shift material. The heat during the mixing and extrusion processes will help chemically bond the color shift core-shell component onto the polymeric matrix. The chemical bonding can be further enhanced during the printing process when heat is applied.

It will be appreciated that several of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims.

Unless specifically recited in a claim, steps or components of claims should not be implied or imported from the specification or any other claims as to any particular order, number, position, size, shape, angle, color or material.

All references cited herein are herein incorporated by reference in their entireties.

What is claimed is:

1. A color shift material for three-dimensional printing comprising:
   a color shift pigment having a core-shell structure, wherein the core comprises a silicon oxide and the shell comprises a metal oxide, wherein the color shift pigment has an average diameter of from about 1 to about 50 µm, and
   a polymeric component selected from the group consisting of acrylonitrile butadiene styrene (ABS), polylactic acid (PLA), nylon, polyethylene terephthalate (PET), polyvinyl alcohol (PVA), high impact polystyrene (HIPS), laywood, and mixtures thereof, wherein the color shift pigment is dispersed within and chemically bonded to the polymeric component and further wherein the polymeric component is presented in the amount of from about 50 percent to about 99 percent by weight of the total weight of the color shift material.

2. The color shift material of claim 1, wherein the silicon oxide comprises silicon dioxide.

3. The color shift material of claim 1, the metal oxide is selected from the group consisting of titanium dioxide, tin oxide, selenium trioxide, ceric oxide, yttrium oxide, ferric oxide, zinc oxide, zirconium oxide, copper oxide, iron oxide, aluminum oxide, zinc iron chrome oxide, iron chrome oxide, nickel antimony titanium oxide, chrome antimony titanium oxide, chrome aluminum oxide, cobalt chrome oxide, cobalt titanium oxide, chrome iron oxide, copper chrome oxide, chrome iron nickel oxide, cobalt aluminum oxide, cobalt chrome aluminum oxide, zinc iron oxide, and mixtures thereof.

4. The color shift material of claim 1, wherein the core comprises from about 10 to about 90 percent by weight of the total weight of the color shift pigment.

5. The color shift material of claim 1, wherein the shell comprises from about 10 to about 90 percent by weight of the total weight of the color shift pigment.

6. The color shift material of claim 1 further comprises a colorant in the amount of from about 0.1 percent to about 5 percent based on the total weight of the color shift pigment.

7. The color shift material of claim 1 having a viscosity of from about 200 centipoise to about 10,000 centipoise at from about 100° C. to about 200° C.

8. The color shift material of claim 1 having a Young's Modulus of from about 0.5 to about 5 gigapascals.

9. The color shift material of claim 1 having a $T_g$ of from about 50° C. to about 200° C.

10. The color shift material of claim 1 having a number average molecular weight from about 5,000 to about 100,000 grams per mole.

11. The color shift material of claim 1 in the form or a filament, a spool or granules.

12. A three-dimensional product comprising a color shift material that comprises:
a color shift pigment having a core-shell structure, wherein the core comprises a silicon oxide and the shell comprises a metal oxide, wherein the color shift pigment has an average diameter of from about 1 to about 50 μm, and
a polymeric component selected from the group consisting of acrylonitrile butadiene styrene (ABS), polylactic acid (PLA), nylon, polyethylene terephthalate (PET), polyvinyl alcohol (PVA), high impact polystyrene (HIPS), laywood, and mixtures thereof, wherein the color shift pigment is dispersed within and chemically bonded to the polymeric component and further wherein the polymeric component is presented in the amount of from about 50 percent to about 99 percent by weight of the total weight of the color shift material.

13. The three-dimensional product of claim 12, wherein the metal oxide of the shell is selected from the group consisting of titanium dioxide, tin oxide, selenium trioxide, ceric oxide, yttrium oxide, ferric oxide, zinc oxide, zirconium oxide, copper oxide, iron oxide, aluminum oxide, zinc iron chrome oxide, iron chrome oxide, nickel antimony titanium oxide, chrome antimony titanium oxide, chrome aluminum oxide, cobalt chrome oxide, cobalt titanium oxide, chrome iron oxide, copper chrome oxide, chrome iron nickel oxide, cobalt aluminum oxide, cobalt chrome aluminum oxide, zinc iron oxide, and mixtures thereof.

14. The three-dimensional product of claim 12, wherein the core comprises from about 10 to about 90 percent by weight of the total weight of the color shift pigment.

15. The three-dimensional product of claim 12, wherein the shell comprises from about 10 to about 90 percent by weight of the total weight of the color shift pigment.

16. The three-dimensional product of claim 12, wherein the color shift material having a viscosity of from about 200 centipoise to about 10,000 centipoise at from about 100° C. to about 200° C.

17. The three-dimensional product of claim 12, wherein the color shift material having a Young's Modulus of from about 0.5 to about 5 gigapascals.

18. The three-dimensional product of claim 12, wherein the color shift material having a $T_g$ of from about 50° C. to about 200° C.

19. A color shift material for three-dimensional printing in the form of a filament comprising:
a color shift pigment having a core-shell structure, wherein the core comprises a silicon oxide and the shell comprises a metal oxide, wherein the color shift pigment has an average diameter of from about 1 to about 50 μm, and
a polymeric component selected from the group consisting of acrylonitrile butadiene styrene (ABS), polylactic acid (PLA), nylon, polyethylene terephthalate (PET), polyvinyl alcohol (PVA), high impact polystyrene (HIPS), laywood, and mixtures thereof, wherein the color shift pigment is heated during an extruding step to form the filament such that the color shift pigment is dispersed within and chemically bonded to the polymeric component and further wherein the polymeric component is presented in the amount of from about 50 percent to about 99 percent by weight of the total weight of the color shift material
wherein the color shift pigment and the polymeric component are extruded with heat at the same time thereby producing a chemically bound pigment-polymeric component.

20. The color shift pigment of claim 19, wherein the core comprises from about 10 to about 90 percent by weight of the total weight of the color shift pigment and wherein the shell comprises from about 10 to about 90 percent by weight of the total weight of the color shift pigment.

* * * * *